Figure 1:
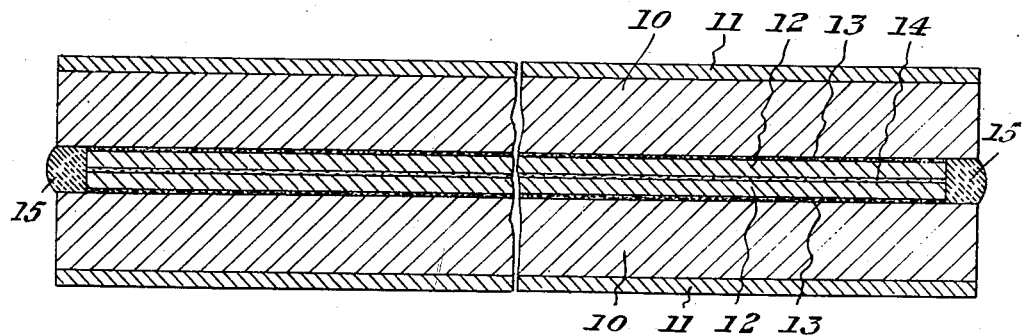

May 30, 1939. J. B. ORR, JR 2,160,559
MANUFACTURE OF COMPOSITE METAL MEMBERS

Filed Oct. 17, 1936

INVENTOR
John B. Orr, Jr.
By
Thomas G. Miller
His attorney

Patented May 30, 1939

2,160,559

UNITED STATES PATENT OFFICE 2,160,559

MANUFACTURE OF COMPOSITE METAL MEMBERS

John B. Orr, Jr., Sewickley, Pa.

Application October 17, 1936, Serial No. 106,256

4 Claims. (Cl. 29—189)

This invention pertains to the making of three-ply composite metal materials such as sheets, strips and/or plates, or in other words, to sheets, strips and/or plates having layers on two sides thereof, and more particularly, to those having stainless or non-corrosive steel layers.

In one aspect, my invention deals with a new and improved procedure for providing three or more part or ply composite metal members.

Previous to the present invention, three-ply has not been a commercial product due to the difficulties which arise in connection with its manufacture and also due to the costs thereof. In fact, the cost of such a type of product has been more than purchasers are willing to pay, and for this reason it has been made at a loss, for the most part, to accommodate customers. In this connection, I have particular reference to three-ply having a carbon steel body or base and stainless, non-corrosive, or other special steel layers on opposite sides or faces of such body.

In my copending application, Serial No. 82,160, entitled "Making composite metals", I have set forth a practical solution of the general problems which arise in connection with the fabrication of composite metals, and for the purpose of illustration, I have applied the procedure developed to the making of two-ply. However, I have definitely determined that certain additional problems arise in making three-ply composite members which further complicate the determination of a practical method.

It is believed that these additional problems can be more fully understood by reference to a procedure that has been employed for making three-ply, and also to certain of my own experimental work.

One investigator attempted to provide a commercial two-ply article by pouring stainless steel completely around a slab of carbon steel suspended in an ingot mold. However, I have found that the carbon steel tends to force its way out of the stainless steel shell during the rolling or hot-working operation; since the carbon steel is softer than the stainless steel, the carbon steel slab tends to elongate more during rolling than the stainless steel shell which surrounds it. Then, too, there is a tendency for the surrounding shell to burst, for, immediately after the assembly has been removed from the heating furnace, the outside or stainless steel layer starts to cool while the interior carbon steel slab remains hot, since there is no loss from radiation in the interior of the assembly and the stainless steel layer or casing tends to contract. This is also due to the different expansion and contraction properties of the carbon steel and the stainless or non-corrosive steel. On the other hand, the carbon steel slab remains at substantially the same elongation and the coating of stainless steel is subjected to considerable stress which frequently causes the covering to burst.

Then too, in pouring stainless or non-corrosive steel, it has been found that it is practically impossible to provide a shell of less than 20% of the total thickness of the ingot since the metal tends to freeze before it can completely fill the narrow space between the carbon insert and the walls of the mold. In present day practice, a relatively thin coating or layer of stainless or non-corrosive steel is all that is needed and the cost, of source, will greatly increase with an increase of thickness. That is, the rolling of such an ingot in the blooming, sheet bar and sheet mills is just as costly as the rolling of solid stainless steel since all croppage losses consist of pure stainless steel. In fact, where this process is now in production, the composite ingot consists of only 38% carbon steel and 62% stainless steel. Large rejections are always encountered due to places between the metals where oxides are trapped or formed in the pouring of the stainless steel shell; such oxide formations prevent a solid, physical weld between the two bodies.

An attempt has been made to build multiple assemblies arranged to produce two pieces of two-ply on the outside of the package and one piece of three-ply between the two pieces of two-ply. Here too, there is tendency for the inside carbon steel to burst through the enveloping shell, since after the package has been removed from the heating furnace and rolled, the same difficulty arises as explained in connection with the poured shell. There is also the disadvantage that two sheets of two-ply steel must be made to produce one sheet of three-ply and it will thus be necessary to produce twice as many two-ply to provide three-ply. This, of course, presents sales and stocking difficulties.

I have attempted to produce three-ply by enclosing a piece of carbon steel in an envelope of stainless steel, but have found that it is almost impossible to prevent the envelope from bursting open during the rolling prior to the obtaining of a solid weld between the stainless steel and the carbon steel, due to the different properties of the two metals, as explained above.

In view of these considerations, it will appear that aside from the fact that it is more difficult to provide a true, solid, or alloyed weld between metals of unlike characteristics than between metals of similar characteristics, difficulty has also been encountered in plying unlike metals, due to their different properties.

The practice previous to the present invention has been to enclose a carbon steel bar or slab within a shell or covering of stainless steel. This has been just the opposite to what the procedure would be if it were based upon the properties of the two metals. That is, the carbon steel is relatively softer than the stainless steel and tends to elongate and expand more than the stainless steel under the same working conditions. I have found that when the carbon steel is on the outside, it may expand without any danger of bursting and that such expansion will be offset by the cooling tendencies of the atmosphere while the inside stainless steel member will remain hot and thus have an elongation which more nearly approximates that of the carbon steel shell.

Previous to the present invention, the different rates of expansion and contraction between metals to be welded offset any tendency of the metals to physically adhere, since the elongation of one metal causes it to tear away from the other.

In view of the above considerations, it has been an object of my invention to determine why those skilled in the art have been unable to produce a successful commercial article of three-ply.

Another object of my invention has been to provide a solution of the troubles and difficulties which were previously encountered by those skilled in the art by utilizing the above-mentioned discoveries.

A further object of my invention has been to provide new and improved procedure for making composite metal members, especially where such members are to have physically adherent surface layers securely welded to two sides thereof.

A still further object has been to provide an improved form of three-ply composite metal member or article.

These and many other objects of my invention will appear to those skilled in the art from the description thereof, the drawing and the appended claims.

In carrying out my invention, I make use of the discovery that when two unlike metals have their surfaces properly alloyed or welded together to form a composite piece, such composite piece will have the properties of expansion and contraction and/or elongation which are representative of the entire piece rather than of the layers of which it has been made. This is true only when the two parts of the composite member have a true physical adherence with respect to each other. In view of this discovery and in view of the discovery of the reasons behind the difficulties which have previously arisen in the fabrication of three-ply metal materials, I have conceived the idea of making three-ply members by plying previously made two-ply members. Furthermore, by employing composite two-ply members, it is not necessary to completely enclose the pack, since the members may be welded or banded at their adjacent edges and for this reason, they are permitted to expand and contract somewhat independently of each other when conditions arise that might otherwise produce strains.

More specifically, I take a pair of two-ply composite members which have a good weld between the materials of which they are composed, place the carbon steel or body portions of the two-ply members in juxtaposition, form a pack with them, and seal off the adjacent faces of the members by welding a band across and along their adjacent edges. In this manner, a fabricating plant having two-ply on hand can either sell it as two-ply or can fabricate it into three-ply. For this reason, there is no danger of having an overstock of either one of the types.

In carrying out the present invention, I preferably employ composite or two-ply members such as have been produced by a method as outlined in my copending application and also preferably provide weld-preventing materials and weld-enhancing materials as well as oxide consuming and scale removing materials, such as employed in the same co-pending application. However, it will appear to those skilled in the art that the present invention is not limited in its application to the employment of two-ply plates produced by such a procedure or to the use of the preferred methods in rolling a pack such as therein set forth.

In the drawing appended hereto for the purpose of illustrating my invention—

Figure 2:
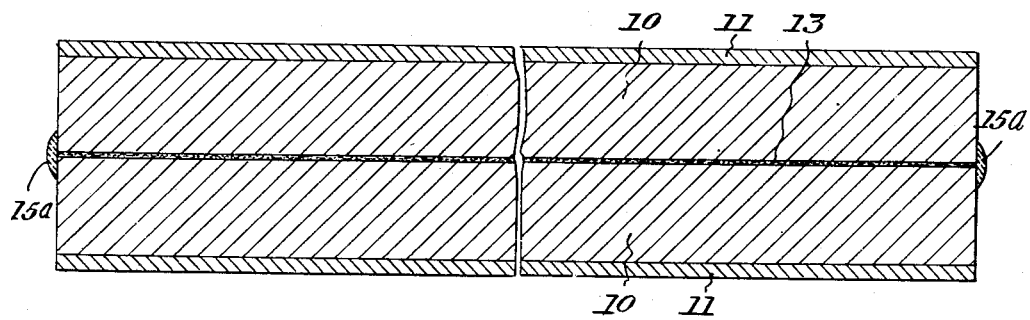

Figure 1 is a cross-sectional view taken through a pile or package made up in accordance with the principles of my invention; and Figure 2 is a similar cross-sectional view in elevation of a pack of modified construction.

In Figure 1, I have shown a pair of two-ply members 10—11 having their faces placed in opposite juxtaposition and having a thin layer of non-corrosive or special steel 12 placed in abutment with the inner face of each one. A suitable weld-preventing material 14 is interposed between the two special steel layers 12 and is preferably calcium oxide, applied as indicated in my co-pending application. To enhance and aid the welding operation, to prevent the formation of pockets, and to eliminate scale, I also preferably interpose a layer of carbonaceous material such as amorphous carbon 13 between each layer of special steel 12 and two-ply 10—11.

For the purpose of illustration, I have shown the outer layer 11 of the two-ply as a separate layer, but I have reference to a composite and plied two-layer member in which the non-corrosive or stainless layer 11 is alloyed to or solidly welded to the body of the carbon steel 10 before the composite member is employed in making the pack.

The pair of enclosed stainless steel layers 12 are preferably provided in lengths which are slightly shorter than the lengths of the two-ply, in order that a suitable weld or band 15 may be applied to seal the adjacent bodies of the two-ply members and thus enclose the inside non-corrosive or stainless steel layers which are to be plied. After the pack has been made, the members may be hot-rolled or worked in the usual manner and welding will take place during the rolling because of the conditions existing within the package.

An alternate to the above procedure is shown in Figure 2. Here, a pair of two-ply members 10—11 have their body or carbon steel portions placed in direct abutment and are welded together in this manner. Preferably, a layer of carbon black or other weld-enhancing carbonaceous material 13 is imposed between the two surfaces, although it is not as important in this connection as when two unlike metals such as carbon steel and stainless steel are to be welded, see Figure 1. The ends of the adjacent body portions of the two-ply members shown in Figure 2 are then suitably welded, see 15a, to seal off the space therebetween prior to the rolling operation. By hot rolling, the two carbon steel surfaces will be welded to each other, making a solid plate or sheet coated on both sides with stainless steel. This method is particularly applicable to the manufacture of thick plates, and the procedure shown in Figure 1 is more applicable to the production of relatively thin plates or sheets. That is, the thinner the pack, the more effective the rolling pressure for accomplishing the welding action. When relatively thick plates are to be welded, it is thus advantageous to form one three-ply member, see Figure 2, rather than two, see Figure 1. On the other hand, when thin sheets are to be rolled, a plurality of them may be simultaneously rolled with sufficient effective rolling pressure, since the pack will not be above the effective size for efficient welding action by roll pressure.

From the above description of my invention, it will be apparent that in application it is not limited to the use of two-ply produced by any particular process and is not limited to the production of any number of three-ply by forming a pack of two-ply members. It will also appear that it, for the first time, places the fabrication of three-ply on a commercial production basis.

I may eliminate pickling operations by utilizing the carbonaceous well-enhancing materials and also by utilizing weld-preventing or separating materials which are non-oxide or non-scale forming. The resultant three-ply composite members or pieces have smooth, shiny surfaces, that are free of scale and irregularities which are produced by impurities introduced or present during forming operations.

Although for the purpose of illustration, I have shown several embodiments of my invention, it will be apparent to those skilled in the art that many modifications, additions, substitutions and/or combinations thereof may be made without departing from the spirit and scope of the invention.

I claim:

1. In a procedure for making composite three-ply members, the steps of forming a group of metal members, at least one member of which is a two-ply member whose plies have been hot-welded together in the presence of an oxygen-absorbing non-oxidizing gas-producing agency, at least partially closing off surface portions of the members to be plied from the atmosphere of which one is the two-ply member, providing an oxygen-absorbing non-oxidizing gas-producing agency adjacent the surface portions to be plied, heating the group to a hot working temperature and hot working the group until a third ply has been welded to the two-ply member.

2. A procedure as set forth in claim 1 wherein the oxygen-absorbing non-oxidizing gas-producing agency is amorphous carbon.

3. In a procedure for making composite a pair of three-ply metal members having a carbon steel base ply and non-corrosive surface plies, the steps of providing two two-ply members having a carbon steel base ply and a non-corrosive surface ply securely welded thereto, grouping the two two-ply members in such a manner that their non-corrosive ply sides are exposed and their carbon steel sides are in an opposed relationship, providing a pair of non-corrosive steel pieces, placing one of said pieces in abutting juxtaposition with the carbon steel side of one of the two-ply members, and placing the other piece in a like position with respect to the carbon steel side of the other two-ply member and in an adjacent relation with respect to the other non-corrosive piece, placing a weld-inhibiting material between adjacent portions of the non-corrosive pieces, heating the group to a temperature sufficient for welding the non-corrosive pieces to the two-ply members, and hot working the group by directly applying a hot working agency to the non-corrosive steel sides of the two-ply members until a pair of securely-bonded composite three-ply members are provided.

4. In a procedure as set forth in claim 3, the additional steps of interposing a layer of weld-enhancing carbonaceous material between the non-corrosive pieces and the carbon steel sides of the two-ply members to which they are to be welded.

JOHN B. ORR, Jr.